United States Patent [19]
Suh et al.

[11] Patent Number: 5,854,295
[45] Date of Patent: Dec. 29, 1998

[54] MICROCELLULAR FOAMS CONTAINING AN INFRARED ATTENUATING AGENT AND A METHOD OF USING

[75] Inventors: Kyung W. Suh, Midland, Mich.; Michio Yamada, Tochigi, Japan; Creston D. Schmidt; Daniel D. Imeokparia, both of Midland, Mich.

[73] Assignee: The Dow Chemical Company, Midland, Mich.

[21] Appl. No.: 889,528

[22] Filed: Jul. 8, 1997

Related U.S. Application Data

[63] Continuation of Ser. No. 459,085, Jun. 2, 1995, Pat. No. 5,679,718, which is a continuation-in-part of Ser. No. 430,785, Apr. 27, 1995, abandoned.

[51] Int. Cl.⁶ ........................................................ C08J 9/14
[52] U.S. Cl. .................. 521/82; 521/79; 521/98; 521/99; 521/131; 521/146; 521/81; 521/918
[58] Field of Search .................................. 521/79, 81, 99, 521/146, 131, 98, 918, 155

[56] References Cited

U.S. PATENT DOCUMENTS

| | | |
|---|---|---|
| 3,580,869 | 5/1971 | Rhodes et al. . |
| 4,473,665 | 9/1984 | Martini-Vvedensky et al. . |
| 4,673,695 | 6/1987 | Aubert et al. . |
| 4,795,763 | 1/1989 | Gluck et al . |
| 5,037,859 | 8/1991 | Williams, Jr. et al. . |
| 5,081,163 | 1/1992 | Pekala . |
| 5,158,986 | 10/1992 | Cha et al. . |
| 5,210,105 | 5/1993 | Paquet et al. . |
| 5,242,647 | 9/1993 | Poco . |
| 5,275,796 | 1/1994 | Tillotson et al. . |
| 5,288,766 | 2/1994 | Narayan et al. . |
| 5,334,356 | 8/1994 | Baldwin et al. . |
| 5,334,624 | 8/1994 | Daems . |
| 5,346,928 | 9/1994 | DeVos et al. . |
| 5,358,802 | 10/1994 | Mayer et al. . |
| 5,373,026 | 12/1994 | Bartz et al. . |
| 5,381,149 | 1/1995 | Dougherty et al. . |
| 5,395,805 | 3/1995 | Droege et al. . |
| 5,674,916 | 10/1997 | Schmidt et al. ............................ 521/79 |
| 5,679,718 | 10/1997 | Sult et al. ................................. 521/79 |

*Primary Examiner*—Morton Foelak
*Attorney, Agent, or Firm*—J. Robert Dan, Jr.

[57] ABSTRACT

Disclosed is an evacuated and unevacuated microcellular foam containing an infrared attenuating agent (IAA). The evacuated foam has an average cell size of about 70 micrometers or less. The unevacuated foam has an average cell size of 1.0 micrometers or less. The IAA provide a greater proportional reduction in foam thermal conductivity in these foams than in foams of larger cell size. Further disclosed is a method of using the foams.

26 Claims, 1 Drawing Sheet

MICROCELLULAR FOAMS CONTAINING AN INFRARED ATTENUATING AGENT AND A METHOD OF USING

CROSS REFERENCE TO RELATED APPLICATION

This application is a Rule 53 Continuation of application U.S. Ser. No. 459,085 filed on Jun. 2, 1995, now U.S. Pat. No. 5,679,718 which is a Continuation-in-Part of application U.S. Ser. No. 08/430,785 filed Apr. 27, 1995, now abandoned.

BACKGROUND OF THE INVENTION

This invention relates to evacuated and unevacuated microcellular foams containing an infrared attenuating agent and a method of using.

Microcellular foams have potential commercial value for use in insulating applications. Such foams have a cell size ranging of about 70 micrometers or less in average cell size. Foams may be formed from a variety of organic and inorganic substances such as thermoplastic polymers, thermoset polymers, silicate aerogels, ceramics, and glass.

In an insulating foam, it is desirable to minimize thermal conductivity or maximize insulating capability. One means of doing so is to incorporate an infrared attenuating agent (IAA) into the foam. Suitable IAA include particulate flakes of metals such as aluminum, silver, and gold; carbonaceous substances such as carbon black and graphite; and certain non-carbonaceous substances such as titanium dioxide. Such incorporation is seen in the art at U.S. Pat. Nos. 4,795,763; 5,210,105; and 5,373,026.

In the present invention, it was surprisingly found that, upon incorporation of IAA into evacuated microcellular foams of cell sizes of 70 micrometers or less, foam thermal conductivity was reduced by a significantly greater proportion than in foams having larger average cell sizes. This greater proportional reduction is particularly observed when comparing the reduction in evacuated microcellular foams to the reduction in unevacuated, closed-cell insulating foams of cell size ranges sold commercially (0.1 to 2.0 millimeters). It was further surprisingly found that incorporation of IAA into unevacuated microcellular foams of cell sizes of 1.0 micrometers or less reduced thermal conductivity by a significantly greater proportion than in unevacuated, closed-cell insulating foams of 0.1 to 2.0 millimeters cell size sold commercial.

BRIEF DESCRIPTION OF THE DRAWING

The features of the present invention will be better understood upon viewing the drawing together with the remainder of the specification.

SUMMARY OF THE INVENTION

Figure 1:
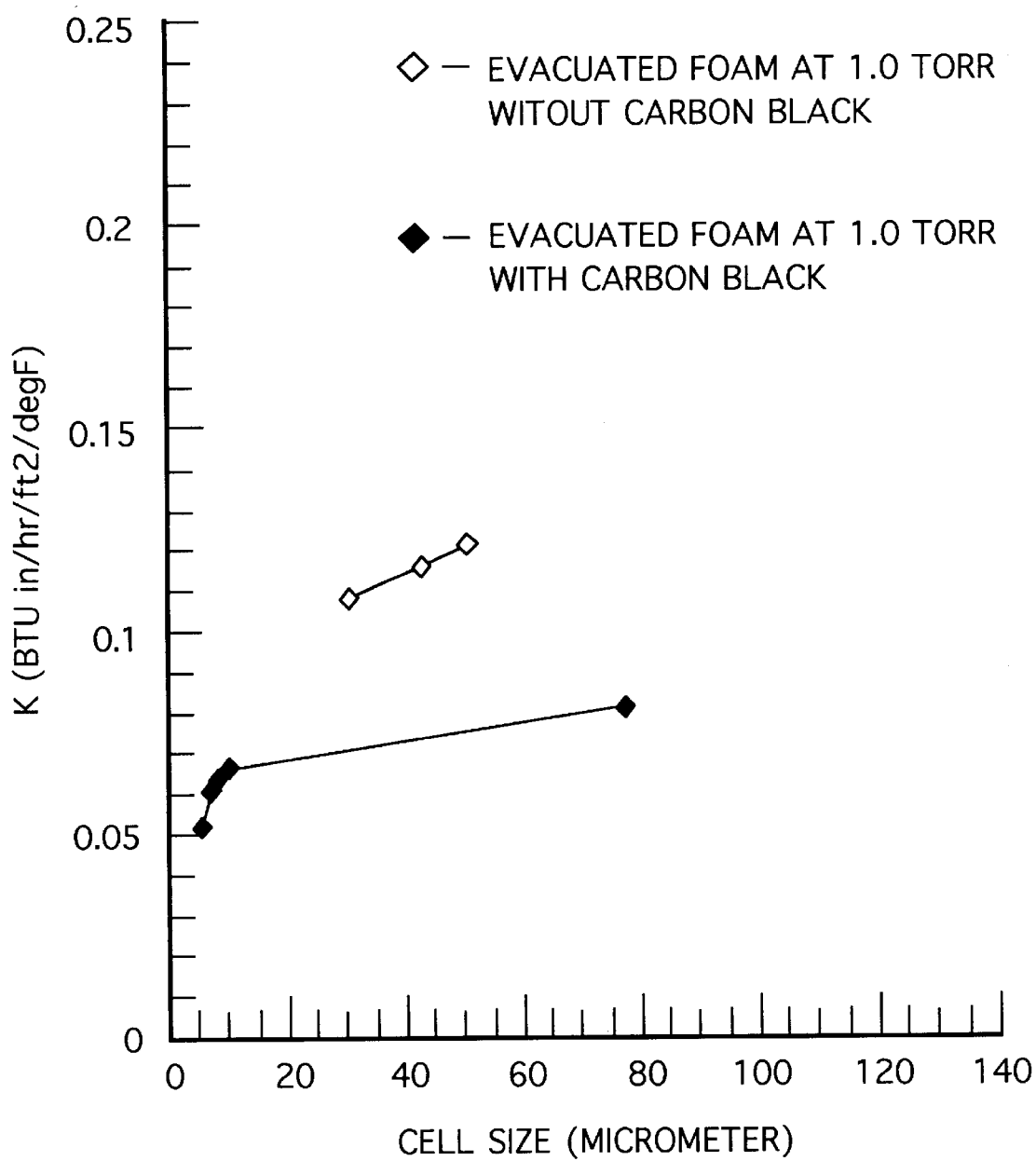
FIG. 1 illustrates thermal conductivity versus cell size for the foams of Example 6 and Control Example 6.

Further according to the present invention, there is an evacuated microcellular foam comprising an IAA. The IAA is present in a quantity sufficient to reduce the thermal conductivity of the foam relative to a corresponding foam without the IAA. The microcellular foam has an average cell size of about 70 micrometers or less.

Further according to the present invention, there is an evacuated or unevacuated microcellular foam comprising an IAA. The IAA is present in a quantity sufficient to reduce the thermal conductivity of the foam relative to a corresponding foam without the IAA. The microcellular foam has an average cell size of about 1.0 micrometer or less.

According to the present invention, there is a method of insulating a surface or enclosure by applying to the surface or enclosure of any of the above microcellular foams.

DETAILED DESCRIPTION

In the present invention, an infrared attenuating agent was incorporated into the microcellular foams to absorb or reflect part or all of the radiation component of heat transfer which may pass through the foam.

A surprising aspect of the invention is that the incorporation of the IAA into a microcellular foam affords a significantly greater proportional reduction in total foam thermal conductivity relative to a corresponding (substantially equivalent average cell size and density) microcellular foam without the IAA than in a foam of larger average cell size with IAA relative to a corresponding foam of larger cell size without IAA. In other words, the IAA induced a greater proportional reduction in total foam thermal conductivity in microcellular foams than in foams of larger average size. The greatest proportional reduction occurs in evacuated foams of cell size of about 70 micrometers or less and in unevacuated (non-evacuated) foams of cell size of about 1.0 micrometer or less.

Evacuated microcellular foams of the present invention have an average cell size of about 70 microns or less, preferably about 1 to about 30 micrometers, more preferably about 1 to about 20 micrometers, and most preferably about 1 to about 10 micrometers.

Unevacuated microcellular foams of the present invention have an average cell size of about 1.0 micrometers or less and preferably about 0.05 to about 1.0 micrometers.

An evacuated foam is a foam having within its cells a partial vacuum or near total vacuum of subatmospheric absolute pressure. An evacuated foam has preferably has an absolute pressure of about 10 torr or less, more preferably about 1 torr or less, and most preferably about 0.1 torr or less.

An unevacuated (non-evacuated) foam is a foam having within its cells an atmospheric pressure.

For purposes of the present invention, the term "microcellular foam" is understood to include microporous foams. Microporous foams are those foams which do not have a defined cellular structure, but have an average void diameter of 70 micrometers or less and a level of voidage of 90 percent or more. Microporous foams are seen in U.S. Pat. Nos. 4,473,665 and 4,673,695, which are incorporated herein by reference.

In polystyrene insulation foams of conventional cell size, i.e., 0.1 to 2.0 millimeters, the incorporation of an IAA has been observed to decrease foam thermal conductivity about 10 to 15 percent. Surprisingly, in the microcellular foams of the present invention, the incorporation of an IAA has been observed to decrease foam thermal conductivity up to about 70 percent, a much larger decrease, in certain cell size ranges.

The infrared attenuating agent (IAA) may be an infrared reflecting or absorbing substance or both. The IAA is composed of a different substance than the substrate of the foam in which it is incorporated. Useful IAA include particulate flakes of metals such as aluminum, silver, and gold and carbonaceous substances such as carbon black, activated carbon black, and graphite. Useful carbon blacks include thermal black, furnace black, acetylene black, and channel black. Useful graphites are natural graphite and synthetic graphite. Preferred IAA are carbon black and graphite. The IAA preferably comprises between about 1.0 and about 20 weight percent, more preferably about 4.0 to about 20 weight percent, and most preferably between about 4.0 and about 10.0 weight percent based upon the weight of the polymer material. Substantial infrared attenuation activity occurs between about 4 percent and about 40 percent based upon the weight of the polymer material. In the case of carbon black and graphite, it is desirable to use particles of a size which achieve a high degree of dispersion in the foam.

Graphite has accentuated or enhanced infrared attenuating activity compared to carbon black in the present microcellular foams. In other words, graphite induces a greater proportional reduction in total foam thermal conductivity in the microcellular size range than carbon black. This is unexpected because the two substances both are substantially carbonaceous and typically exhibit similar levels of infrared attenuating activity in foams of larger, i.e., conventional, cell size. This enhanced activity may be observed in evacuated foams of cell sizes of 70 micrometers or less and in unevacuated foams of cell sizes of 1.0 micrometers or less.

The present microcellular foams can be comprised of any known organic or inorganic substance known to be useful in foaming. Useful substances include thermoplastic polymers, thermoset polymers, aerogels, ceramics, and glass. Useful thermoplastic polymers include ethylene polymers and alkenyl aromatic polymers. Useful ethylene polymers include polyethylenes such as low density polyethylene. Useful thermoset polymers include polyisocyanurates, polyurethanes and phenolics.

A preferred microcellular foam comprises an alkenyl aromatic polymer material. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 and preferably greater than 70 weight percent alkenyl aromatic monomeric units. Most preferably, the alkenyl aromatic polymer material is comprised entirely of alkenyl aromatic monomeric units.

Suitable alkenyl aromatic polymers include those derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{2-6}$ alkyl acids and esters, ionomeric derivatives, and $C_{4-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. Preferred foams comprise substantially (i.e., greater than 95 percent) and most preferably entirely of polystyrene. Preferably, the alkenyl aromatic polymer foam is free of rubber content such as $C_{4-6}$ dienes and thermoset polymer content such as polyisocyanurate or polyurethane.

A useful microcellular foam is an extruded, open-cell alkenyl aromatic polymer foam. The open-cell foam comprises an alkenyl aromatic polymer material comprising greater than 50 weight percent of alkenyl aromatic polymer units. Preferably, the foam is comprised entirely of polystyrene. The foam has an open cell content of about 70 percent or more, preferably about 90 percent or more, and most preferably about 95 percent or more open cell according to ASTM 2856-A. The foam has an average cell size of about 70 micrometers or less and preferably from about 1 to about 30 micrometers. The foam is particularly useful in vacuum insulation panels. Description of its methods of manufacture are seen below and in copending application attorney's docket number C-41,676, which is incorporated herein by reference.

The extruded, open-cell microcellular foam may be prepared by heating a thermoplastic material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. The amount of blowing agent incorporated is about 0.06 to 0.17 gram-moles per kilogram of polymer or less. A nucleating agent such as talc is blended in the polymer melt or dry blended with the polymer material prior to plasticizing or melting. The foamable gel is typically cooled to a lower foaming temperature to optimize desired physical characteristics of the foam. The gel may be cooled in the extruder or other mixing device or in separate coolers. The foaming temperature must be high enough to allow formation of the open-cell structure but low enough to prevent foam collapse upon extrusion. Desirable foaming temperatures range from about 118° C. to about 160° C. and preferably from about 125° C. to about 135° C. The gel is then extruded or conveyed through a die of desired shape to a zone of reduced or lower pressure to form the foam. The zone of lower pressure is at a pressure lower than that in which the foamable gel is maintained prior to extrusion through the die. The lower pressure may be superatmospheric or subatmospheric (evacuated or vacuum), but is preferably at an atmospheric level.

Microcellular polyurethane and polyisocyanurate foams can be made by reacting two preformulated components, commonly called the A-component and the B-component. The blowing agent may be dispersed in either the isocyanate or the polyol or both.

Suitable polyisocyanates include diisocyanates such as m-phenylene diisocyanate, toluene-2,4-diisocyanate, toluene-2,6-diisocyanate, mixtures of 2,4- and 2,6-toluene diisocyanate, hexamethylene-1, 6-diisocyanate, tetramethylene-1,4-diisocyanate, cyclohexane-1,4-diisocyanate, hexahydrotoluene 2,4- and 2,6-diisocyanate, naphthalene-1,5-diisocyanate, diphenyl methane-4,4'-diisocyanate, 4,4'-diphenylenediisocyanate, 3,3'-dimethoxy-4,4'-biphenyldiisocyanate, 3,3'-dimethyl-4,4'-biphenyldiisocyanate, and 3,3'-dimethyldiphenylmethane-4, 4'-diisocyanate; the triisocyanates such as 4,4',4"- triphenylmethane-triisocyanate, polymethylenepolyphenyl isocyanate, toluene-2,4,6-triisocyanate; and the tetraisocyanates such as 4,4'-dimethyldiphenylmethane-2,2',5,5'-tetraisocyanate.

Suitable polyols include: ethylene glycol; propylene glycol-(1,2) and -(1,3); butylene glycol-(1,4) and -(2,3); hexane diol-(1,6); octane diol-(1,8); neopentyl glycol; 1,4-bishydroxymethyl cyclohexane; 2-methyl-1,3-propane diol; glycerin; trimethylolpropane; trimethylolethane; hexane triol-(1,2,6); butane triol-(1,2,4); pentaerythritol; quinitol; mannitol; sorbitol; formitol; a-methyl-glucoside; diethylene glycol; triethylene glycol; tetraethylene glycol and higher polyethylene glycols; dipropylene glycol and higher polypropylene glycols as well as dibutylene glycol and higher polybutylene glycols. Suitable polyols further include oxyalkylene glycols, such as diethylene glycol, dipropylene glycol, triethylene glycol, tripropylene glycol, tetraethylene glycol, tetrapropylene glycol, trimethylene glycol and tetramethylene glycol.

Polyurethane foams can be prepared by reacting the polyol and the isocyanate on a 0.7:1 to 1.1:1 equivalent basis. The polyisocyanurate foams of the invention are advantageously prepared by reacting the polyisocyanate with a minor amount of polyol to provide about 0.10 to 0.70 hydroxyl equivalents of polyol per equivalent of polyisocyanate. Useful polyurethanes and polyisocyanurates and processes for making them are seen in U.S. Pat. Nos. 3,580,869; 4,795,763; 5,288,766; 5,334,624; and 5,346,928, which are incorporated herein by reference.

Aerogels may be comprised of a variety of materials such as silica, metal oxides, carbon, and formaldehyde derivatives. Teachings to aerogels and methods of making are found in U.S. Pat. Nos. 5,081,163; 5,242,647; 5,275,796; 5,358,802; 5,381,149; and 5,395,805, which are incorporated herein by reference.

Microporous thermoplastic foams can be formed by phase separation, by microemulsions, or by use of supercritical fluids such as seen in U.S. Pat. Nos. 4,673,695; 4,473,665; 5,037,859; 5,158,986; and 5,334,356, which are incorporated herein by reference.

Microcellular thermoplastic foams may be crosslinked or uncrosslinked. The term "non-crosslinked" means the foam is substantially free of crosslinking. The term is inclusive however, of the slight degree of crosslinking which may occur naturally without the use of crosslinking agents or radiation. Non-crosslinked foams contain no more than 5 percent gel per ASTM D-2765-84 Method A.

The microcellular foams preferably have the density of from about 16 to about 250 and most preferably from about 25 to about 100 kilograms per cubic meter according to ASTM D-1622-88.

The microcellular foams may take any physical configuration known in the art such as sheet or plank. The present foam is particularly suited to be formed into a plank, desirably one having a cross-sectional area of 30 square centimeters (cm) or more and a minor dimension in cross-section (thickness) of about ⅜ inch (0.95 centimeter) or more.

The average cell size or pore size (diameter) for the microcellular foams is determined according to ASTM D3576-77 except that measurement is taken from an enlarged photograph obtained by scanning electron microscopy instead of measurement taken directly from the foam.

The microcellular foams may be closed cell or open cell. Preferred open cell foams are those having about 70 percent open cell content according to ASTM D2856-A. An open cell foam more preferably has about 90 percent or more, and most preferably 95 percent or more open cell content according to ASTM D2856-A. Closed-cell foams are those having closed cell content of about 90 percent or more and preferably about 95 percent or more according to ASTM D-2856-A.

Open cell foams are useful in evacuated or vacuum insulation panels. Preferably, the open cell foams are maintained at a pressure of about 10 torr absolute or less and preferably at about 1 torr absolute or less and most preferably about 0.1 torr or less.

The microcellular foams may be used to insulate a surface or enclosure by applying to the surface or enclosure an insulating panel fashioned from the present structure. Such panels are useful in any conventional insulating applications such as roofing, buildings, refrigerators, etc.

The following are examples of the present invention, and are not to be construed as limiting. Unless otherwise indicated, all percentages, parts, or proportions are by weight.

EXAMPLES

Microcellular polystyrene foams containing carbon black and graphite of the present invention were prepared as described below. The foams were tested for insulating capability in an evacuated (vacuum) environment at 0.2 torr, 1 torr, and 5 torr and at atmospheric pressure (760 torr). Insulating capability was measured as "R value per inch", which corresponds to the reciprocal of thermal conductivity in units of $Btu \cdot in/hr \cdot ft^2 \cdot F°$

Example 1

Foams were prepared with two different extrusion systems, each comprising an extruder, a mixer, a cooler, and an extrusion die in series. The two systems operated at different extrusion rates, 10 pounds per hour (lb/hr) (4.5 kilograms/hour (kg/hr) and 220 lb/hr (100 kg/hr), They are referred to as the first and the second extrusion systems, respectively.

The foams of the first extrusion system were made with the following formulation: a blowing agent of 7.5 parts per hundred (pph) of HCFC-142b, 2.0 pph EtCl, and 1.4 pph $CO_2$); optionally carbon black (Raven 430 of Cabot Corp.); 0.5 pph talc; a minor amount of calcium stearate; and a polystyrene resin of 200,000 weight average molecular weight according to size exclusion chromatography (SEC).

The foams of the second extrusion system were made with the following formulation: a blowing agent of 6.8 pph HFC-134a, 1.9 pph HFC-152a, and 0.6 pph $CO_2$; carbon black (Thermal Black FT 239 of Huber Corp.); 0.4 pph talc; minor amount of calcium stearate; and polystyrene resin of 200,000 weight average molecular weight according to size exclusion chromatography (SEC).

Foams were made in both extrusion systems with various carbon black loadings and at various foaming temperatures. The R value for foams was measured at atmospheric pressure (760 torr) and in a vacuum (1 torr). R value was measured according to ASTM C-518-91 in an environmental pressure control system capable of maintaining its set point condition within ±0.01 torr wherein the control system is employed in conjunction with a heat flow meter apparatus.

Microcellular foams of small average cell size and high open cell content were produced. Cell size, open-cell content, density, and R value are set forth in Table 1. For microcellular foams made in both extrusion systems, increasing the level of carbon black increased R value.

Example 2

Foams of the present invention were prepared with the second extrusion system except as indicated below and in Table 2.

The foams were prepared with various blowing agents and mixtures thereof as specified in Table 2. The blowing agent loadings were pph based upon polymer weight. The foams were made with various carbon black loadings and at various foaming temperatures.

The R value for foams was measured at various pressures.

Microcellular foams of small average cell size, high open cell content, and high R value were produced.

Example 3

Foams of the present invention were prepared with the second extrusion system except as indicated below and in Table 3.

The foams were prepared with various blowing agents and mixtures thereof as specified in Table 3. The blowing agent loadings were pph based upon polymer weight. The foams were made with various carbon black loadings and at various foaming temperatures.

The R value for foams was measured at various pressures.

Microcellular foams of small average cell size, high open cell content, and high R value were produced.

Example 4

Foams of the present invention were prepared with the second extrusion system except as indicated below and in Table 4.

Microcellular foams of small average cell size and high open cell content were produced.

Due to the addition of carbon black, the cross-section of Run 42 could be made larger than that of Run 41. The carbon black increased gel viscosity, and allowed the die opening to be enlarged without losing die pressure and causing prefoaming. The increase in die opening resulted in a foam of larger cross-section being produced. The larger cross-section affords improved skin quality and greater process versatility.

Example 5

Foams of the present invention were prepared with the second extrusion system except as indicated below and in Table 5.

The foams were prepared with various blowing agents and mixtures thereof as specified in Table 5. The blowing agent loadings were pph based upon polymer weight. The foams were made with various carbon black loadings and at various foaming temperatures.

The R value for foams was measured at various pressures.

Microcellular foams of small average cell size, high open cell content, and high R value were produced.

Example and Control Example 6

Extruded, open-cell, microcellular polystyrene foams with and without carbon black were tested for thermal conductivity to determine the approximate level of enhancement due to the inclusion of carbon black. The foams were tested at an absolute air pressure of 1 torr at 75° F. The carbon black was thermal black FT239 (Huber Corp.).

Thermal conductivity as a function of average cell size with and without carbon black was plotted in FIG. 1.

As surmised from the plots, the reduction in foam thermal conductivity in the cell size range of about 30 to 50 micrometers was approximately 35–40 percent. This reduction is far in excess of the typical 10–15 percent reduction observed in conventional extruded, closed cell polystyrene foams of 0.1–1.0 millimeter cell size.

Example 7 and Control Example 7

Open-cell, microporous polystyrene foams with and without carbon black were tested for thermal conductivity to determine the approximate level of enhancement due to the inclusion of carbon black. The foams were tested at atmospheric pressure and at an absolute pressure of 0.1 torr, both at 75° F. The carbon black was furnace black Monarch 1400 (Cabot Corp.). The pore sizes in each of the foams ranged in a distribution from about 0.1 to about 0.5 micrometers.

As seen in Table 6, the incorporation of carbon black resulted in a reduction in thermal conductivity of approximately 25–45 percent for foams at atmospheric pressure of comparable density. For evacuated foams of comparable density at 0.1 torr, incorporation of carbon black resulted in a reduction in thermal conductivity of approximately 60–70 percent. This reduction is far in excess of the typical 10–15 percent reduction observed in conventional extruded, closed cell polystyrene foams of 0.1–1.0 millimeter cell size.

TABLE 1

Foams Prepared in Example 1

| Run Number | Ext. Rate lb/hr (kg/hr) | Carbon Black (pph) | Foaming Temp. (°C.) | Foam Density pcf (kg/m$^3$) | Cell Size (mm) | Open Cell (percent) | R/inch 1 torr | R/inch 760 torr |
|---|---|---|---|---|---|---|---|---|
| 1 | 10 (4.5) | 10.0 | 155 | 1.82 (29.12) | 0.04 | 99 | 7.41 | — |
| 2 | 10 (4.5) | 15.0 | 145 | 1.94 (31.04) | 0.02 | 99 | 13.7 | — |
| 3* | 220 (100) | 0.0 | 133 | 2.75 (44) | 0.02 | 94.6 | 9.09 | 3.92 |
| 4 | 220 (100) | 7.0 | 132 | 3.31 (52.96) | 0.011 | 92.7 | 15.38 | 4.37 |
| 5 | 220 (100) | 10.0 | 132 | 4.15 (66.4) | 0.006 | 95.7 | 16.13 | 4.52 |
| 6 | 220 (100) | 15.0 | 132 | 4.08 (65.28) | 0.01 | 94.3 | 17.86 | 4.55 |

*not an example of the present invention

TABLE 2

Foams Prepared in Example 2

| Run Number | Blowing Agent | Carbon Black (pph) | Foaming Temp. (°C.) | Foam Density pcf (kg/m$^3$) | Cell Size (mm) | Open Cell (percent) | R/inch 1 torr | R/inch 760 torr |
|---|---|---|---|---|---|---|---|---|
| 7* | 9.0 HFC-134a/3.0 EtCl | 0.0 | 131 | 2.49 (39.84) | 0.043 | 99.7 | — | — |
| 8* | 8.0 HFC-134a/1.0 EtCl/0.6 CO$_2$ | 0.0 | 131 | 3.07 (49.12) | 0.024 | 99.5 | — | — |
| 9 | 4.0 CO$_2$/0.5 EtOH | 10.0 | 131 | 2.53 (40.48) | 0.068 | 88.4 | — | — |
| 10 | 4.0 HFC-152a/1.0 EtCl/1.5 CO$_2$ | 10.0 | 131 | 2.51 (40.16) | 0.049 | 84.1 | — | — |
| 11 | 8.0 HFC-152a/0.6 CO$_2$ | 10.0 | 133 | 2.31 (36.96) | 0.049 | 97.1 | — | — |
| 12 | 5.0 HFC-152a/3.5 HFC-134a | 10.0 | 133 | 2.32 (37.12) | 0.038 | 95.5 | — | — |
| 13 | 6.8 HFC-134a/1.9 HFC-152a/.27 Argon | 10.0 | 131 | 4.39 (70.24) | 0.005 | 94.3 | 16.39 | — |
| 14 | 6.8 HFC-134a/2.4 HFC-152a/.19 N$_2$ | 10.0 | 131 | 2.87 (45.92) | 0.005 | 95.4 | 12.21 | — |
| 15 | 6.8 HCF-134a/2.4 HFC-152a | 10.0 | 131 | 5.13 (82.08) | 0.005 | 93.3 | 14.29 | — |
| 16 | 6.8 HFC-134a/2.4 HFC-152a/.34 Celogen AZ130 | 10.0 | 131 | 3.51 (56.16) | 0.007 | 95.4 | 15.38 | — |
| 17 | 6.8 HFC-134a/1.9 HFC-152a/0.6 CO$_2$ | 7.0 | 132 | 3.31 (52.96) | 0.011 | 92.7 | 15.38 | — |
| 18 | 10.6 HFC-134a | 6.9 | 127 | 3.48 (55.68) | 0.025 | 98.0 | — | — |
| 19 | 8.5 HFC-134a/0.9 HCFC-142b | 6.9 | 125 | 4.35 (69.6) | 0.008 | 98.0 | — | — |
| 20 | 7.0 HFC-143a/0.9 HCFC-142b | 6.9 | 126 | 4.08 (65.28) | 0.007 | — | — | — |
| 21 | 5.5 HFC-143a/2.4 HCFC-22 | 6.9 | 123 | 4.28 (68.48) | 0.012 | 96.0 | 13.51 | 4.31 |
| 22 | 8.0 HCFC-22 | 6.9 | 130 | 3.15 (50.4) | 0.065 | 97.0 | — | — |
| 23 | 8.4 HFC-134a/0.8 HCFC-22 | 10.0 | 126 | 3.89 (62.24) | 0.009 | 97.0 | 13.51 | 4.46 |

*not an example of the present invention
— Celogen AZ130 is a chemical blowing agent of Uniroyal Corp.

TABLE 3

Foams Prepared in Example 3

| Run Number | Blowing Agent | Carbon Black (pph) | Foaming Temp. (°C.) | Cell Size (mm) | Open Cell (percent) | R/inch | Vacuum Pressure (torr) |
|---|---|---|---|---|---|---|---|
| 24* | 8.0 HFC-134a/2.0 EtCl | 0.0 | 131 | 0.041 | 95.5 | 12.5 | 0.2 |
| 25* | 8.0 HFC-134a/2.0 EtCl | 0.0 | 131 | 0.041 | 95.5 | 8.62 | 1.0 |
| 26* | 8.0 HFC-134a/2.0 EtCl | 0.0 | 131 | 0.041 | 95.5 | 6.58 | 5.0 |
| 27* | 8.0 HFC-134a/2.0 EtCl | 0.0 | 131 | 0.041 | 95.5 | 5.71 | 10.0 |
| 28 | 8.0 HFC-134a/2.0 EtCl | 10 | 129 | 0.048 | 96 | 18.18 | 0.2 |
| 29 | 8.0 HFC-134a/2.0 EtCl | 10 | 129 | 0.048 | 96 | 11.49 | 1.0 |
| 30 | 8.0 HFC-134a/2.0 EtCl | 10 | 129 | 0.048 | 96 | 7.25 | 5.0 |
| 31 | 8.0 HFC-134a/2.0 EtCl | 10 | 129 | 0.048 | 96 | 6.02 | 10.0 |
| 32 | 8.6 HFC-134a/2.4 HFC-152a | 10 | 123 | 0.005 | 98 | 18.0 | 0.2 |
| 33 | 8.6 HFC-134a/2.4 HFC-152a | 10 | 123 | 0.005 | 98 | 12.4 | 1.0 |
| 34 | 8.6 HFC-134a/2.4 HFC-152a | 10 | 123 | 0.005 | 98 | 9.5 | 5.0 |
| 35 | 8.6 HFC-134a/2.4 HFC-152a | 10 | 123 | 0.005 | 98 | 7.0 | 10.0 |
| 36 | 7.5 HFC-134a/2.0 HFC-152a | 6.9 | 127 | 0.006 | 97 | 20.8 | 0.2 |
| 37 | 7.5 HFC-134a/2.0 HFC-152a | 6.9 | 127 | 0.006 | 97 | 18.87 | 1.0 |
| 38 | 7.5 HFC-134a/2.0 HFC-152a | 6.9 | 127 | 0.006 | 97 | 9.26 | 5.0 |
| 39 | 7.5 HFC-134a/2.0 HFC-152a | 6.9 | 127 | 0.006 | 97 | 5.09 | 10.0 |

*not an example of the present invention

TABLE 4

Foams Prepared in Example 4

| Run Number | Blowing Agent | Carbon Black (pph) | Foaming Temp. (°C.) | Foam Density pcf (kg/m$^3$) | Cell Size (mm) | Open Cell (percent) | Board Dimen. inch x inch (cm x cm) Ver. x Hor. |
|---|---|---|---|---|---|---|---|
| 40* | 8.0 HFC-134a/1.0 EtCl/0.6 CO$_2$ | 0.0 | 131 | 3.07 (49.12) | 0.030 | 99.5 | ⅜ x 2 ½ (.95 x 6.35) |
| 41 | 8.0 HFC-134a/1.0 EtCl/0.6 CO$_2$ | 10.0 | 131 | 2.60 (41.6) | 0.040 | 98.6 | ⅝ x 3 ½ (1.59 x 8.89) |

Ver. x Hor.- vertical direction and horizontal direction in cross-section
*not an example of the present invention

TABLE 5

Foams Prepared in Example 5

| Run Number | Blowing Agent | Carbon Black (pph) | Foaming Temp. (°C.) | Foam Density pcf (kg/m$^3$) | Cell Size (mm) | Open Cell (percent) | R/inch 1 torr | R/inch 760 torr |
|---|---|---|---|---|---|---|---|---|
| 42 | 7.1 HFC-134a | 10 pph syn graph[1] | 130 | 3.82 (61.12) | 0.009 | 100 | 20.6 | — |
| 43 | 7.1 HFC-134a | 5 pph syn graph 5 pph ther black[2] | 130 | 3.68 (58.88) | 0.008 | 99 | 20.0 | — |
| 44 | 7.1 HFC-134a | 10 pph nat graph[3] | 131 | 3.66 58.56) | 0.007 | 95 | 18.3 | — |
| 45 | 12.2 HFC-134a | 10 pph furn black[4] | 130 | 2.96 (47.36) | 0.008 | 98 | 17.2 | — |

[1]syn graph - synthetic graphite LS2849 of Graphite Products.
[2]the black - thermal black FT 239 of Huber Corp.
[3]nat graph - natural graphite GP601 of Graphite Products.
[4]furn black - furnace black Monarch 1400 of Cabot Corp.

TABLE 6

Foams Tested in Example 7 and Control Example 7

| Run Number | Carbon Black (percent) | Foam Density pcf (kg/m$^3$) | K-factor[1] (atm.press.[2]) | R/inch (atm.press.[2]) | K-factor (0.1 torr[3]) | R/inch (0.1 torr[3]) |
|---|---|---|---|---|---|---|
| 46 | 0 | 2.28 (36.48) | 0.266 | 3.76 | 0.163 | 6.13 |
| 47 | 0 | 2.46 (39.36) | 0.302 | 3.31 | 0.210 | 4.76 |
| 48 | 0 | 2.70 (43.2) | 0.252 | 3.97 | 0.153 | 6.54 |
| 49 | 0 | 2.99 (47.84) | 0.283 | 3.53 | 0.189 | 5.29 |
| 50 | 0 | 3.12 (49.92) | 0.245 | 4.08 | 0.147 | 6.80 |
| 51 | 10 | 2.58 (41.28) | 0.187 | 5.35 | 0.070 | 14.3 |
| 52 | 10 | 2.92 (46.72) | 0.174 | 5.75 | 0.065 | 15.4 |
| 53 | 10 | 3.18 (50.88) | 0.168 | 5.95 | 0.059 | 16.9 |
| 54 | 10 | 3.02 (48.32) | 0.157 | 6.37 | — | — |
| 55 | 10 | 3.04 (48.64) | 0.159 | 6.29 | — | — |

[1]BTU · in/ft · hr · F° (thermal conductivity)
[2]atm.press.- foam at atmospheric pressure
[3]0.1 torr - foam at 0.1 torr absolute pressure While embodiments of the foam of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. A microcellular foam, comprising a foam material, the foam having an average cell size of about 1.0 micrometers or less and having a density of about 16 to about 250 kilograms per cubic meter, the foam further comprising an infrared attenuating agent in a quantity sufficient to reduce thermal conductivity of the foam relative to a corresponding foam without the infrared attenuating agent.

2. The foam of claim 1, wherein the foam has an average cell size of about 0.05 to about 1.0 micrometers.

3. The foam of claim 1, wherein the infrared at tenuating agent comprises carbon black.

4. The foam of claim 1, wherein the infrared attenuating agent is graphite.

5. The foam of claim 1, wherein the foam has a density of about 25 to about 100 kilograms per cubic meter.

6. The foam of claim 1, wherein the infrared attenuating agent is present at from about 1 to about 20 weight percent based upon polymer weight.

7. The foam of claim 1, wherein the infrared attenuating agent is present at from about 4 to about 20 weight percent based upon polymer weight.

8. The foam of claim 1, wherein the infrared attenuating agent is present at from about 4 to about 10 weight percent based upon polymer weight.

9. The foam of claim 1, wherein the foam is an alkenyl aromatic polymer foam.

10. The foam of claim 1, wherein the foam is an alkenyl aromatic polymer foam.

11. The foam of claim 1, wherein the foam is a polyisocyanurate foam.

12. The foam of claim 1, wherein the foam is a polyurethane foam.

13. The foam of claim 1, wherein the foam is an aerogel.

14. The foam of claim 1, wherein the foam has an open cell content of about 70 percent or more.

15. The foam of claim 1, wherein the infrared attenuating agent is selected from the group consisting of carbon black and graphite, the infrared attenuating agent being present at from about 1 to about 20 weight percent based upon the weight of the polymer, the foam having a density of from about 16 to about 250 kilograms per cubic meter, the foam having an open cell content of about 90 percent or more.

16. The foam of claim 1, wherein the foam has an average cell size of about 0.5 to about 1.0 micrometers, the infrared attenuating agent being selected from the group consisting of carbon black and graphite, the infrared attenuating agent being present at from about 4 to about 10 weight percent based upon the weight of the polymer, the foam having a density of from about 25 to about 100 kilograms per cubic meter, the foam having an open cell content of about 95 percent or more.

17. The foam of claim 15, wherein the foam is an alkenyl aromatic polymer foam.

18. The foam of claim 16, wherein the foam is an alkenyl aromatic polymer foam.

19. The foam of claim 15, wherein the foam is a polyisocyanurate foam.

20. The foam of claim 15, wherein the foam is a polyurethane foam.

21. The foam of claim 16, wherein the foam is a polyisocyanurate foam.

22. The foam of claim 16, wherein the foam is a polyurethane foam.

23. A method of insulating a surface or enclosure, comprising applying to the surface or enclosure the microcellular foam of claim 1.

24. The foam of claim 1, wherein the foam has an atmospheric pressure.

25. The foam of claim 14, wherein the foam has an atmospheric pressure.

26. The foam of claim 16, wherein the foam has an atmospheric pressure.

* * * * *

UNITED STATES PATENT AND TRADEMARK OFFICE
CERTIFICATE OF CORRECTION

PATENT NO : 5,854,295

DATED : Dec. 29, 1998

INVENTOR(S) : Kyung W. Suh; Michio Yamada; Creston D. Schmidt; Daniel D. Imeokparia It is certified that error appears in the above-identified patent and that said Letters Patent are hereby corrected as shown below:

Col. 11, Line 54, "at tenuating" should read --attenuating--.

Signed and Sealed this

Tenth Day of April, 2001

Attest:

NICHOLAS P. GODICI

*Attesting Officer*      *Acting Director of the United States Patent and Trademark Office*